United States Patent [19]

Schluderberg

[11] Patent Number: 4,538,674
[45] Date of Patent: Sep. 3, 1985

[54] HEAT EXCHANGER HAVING TUBULAR MEMBERS CONCENTRIC WITH FLUID CARRYING TUBES TO PREVENT MIXING OF THE HEAT EXCHANGE FLUIDS AND METHOD OF CONSTRUCTION THEREOF

[75] Inventor: Donald C. Schluderberg, Lynchburg, Va.

[73] Assignee: The Babcock & Wilcox Company, New Orleans, La.

[21] Appl. No.: 421,551

[22] Filed: Sep. 22, 1982

[30] Foreign Application Priority Data
Jul. 16, 1982 [AU] Australia ............ PCT/US82/00960

[51] Int. Cl.³ ............................................. F28F 11/00
[52] U.S. Cl. .................................... 165/70; 165/76; 165/141; 165/178; 165/180
[58] Field of Search .............. 165/70, 134 R, 180, 165/183, 178, 140, 76, 78, 141, 160

[56] References Cited

U.S. PATENT DOCUMENTS

| | | | |
|---|---|---|---|
| 2,061,427 | 11/1936 | King | 165/180 |
| 2,365,515 | 12/1944 | Baudry | 165/70 |
| 2,658,728 | 11/1953 | Evans, Jr. | 165/70 X |
| 4,090,554 | 5/1978 | Dickinson | 165/70 X |
| 4,228,848 | 10/1980 | Wadkinson, Jr. | 165/70 X |
| 4,305,453 | 12/1981 | Wagner | 165/178 X |

FOREIGN PATENT DOCUMENTS

| | | | |
|---|---|---|---|
| L 12011 | 4/1956 | Fed. Rep. of Germany | 165/180 |
| 55-63395 | 5/1980 | Japan | 165/134 R |
| 1155899 | 6/1969 | United Kingdom | 165/70 |

*Primary Examiner*—Sheldon J. Richter
*Attorney, Agent, or Firm*—Robert J. Edwards; James C. Simmons; D. Neil LaHaye

[57] ABSTRACT

An heat exchanger including a shell for flow of a first fluid and a plurality of tubes for flow of a second fluid in heat exchange relation therewith. A tubular member is concentric with at least a portion of a tube to define a space between the tube and tubular member. The tubular member includes at least one radially outwardly longitudinally extending projection portion for effecting flexing of the tubular member radially outwardly so that a minimum clearance between the tube and tubular member may be provided, and so that the tube may be inserted in and removed from the tubular member to provide greater accessibility for welding tubular members to tube sheets during assembly. Oxygen may be introduced into the space between the tubular member and tube to combine with tritium which may diffuse through the tubular member wall to prevent diffusion of the tritium through the tube wall.

4 Claims, 6 Drawing Figures

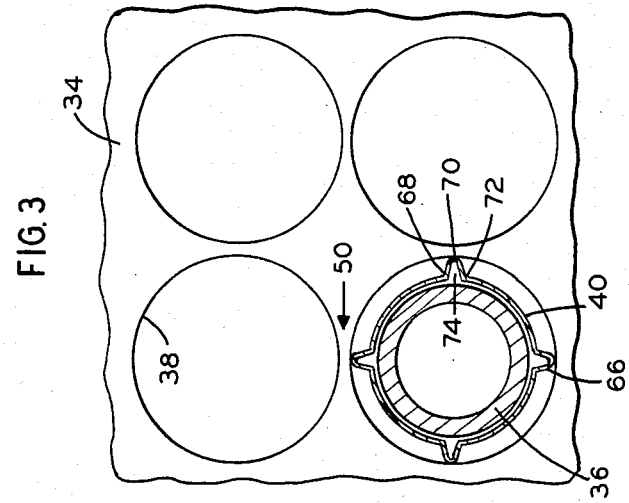
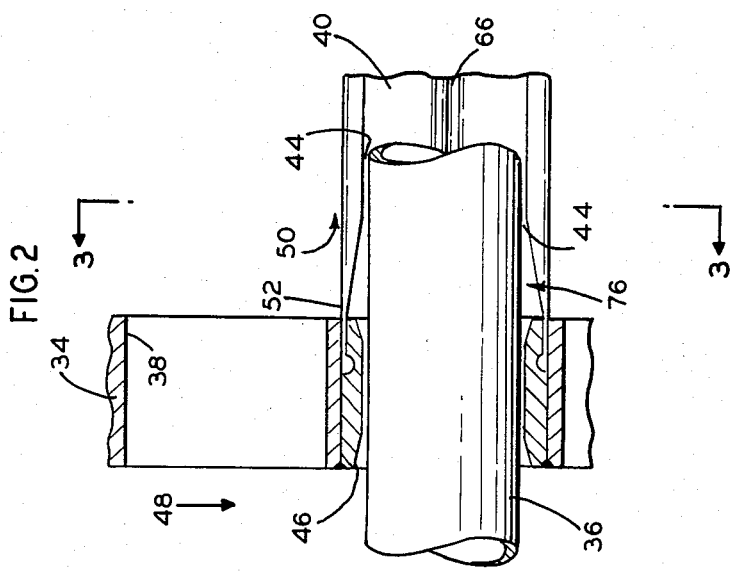

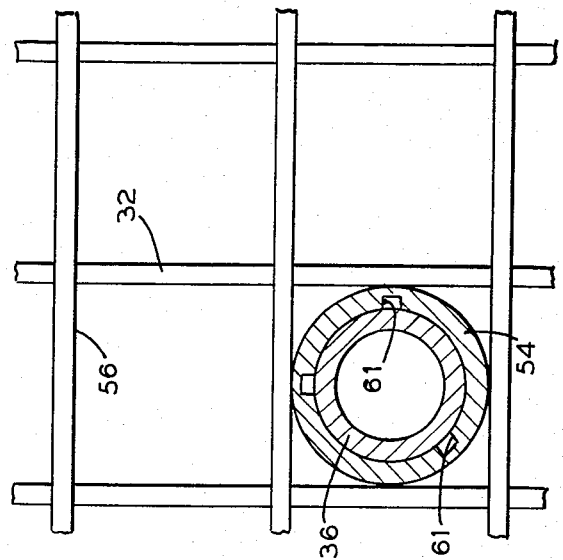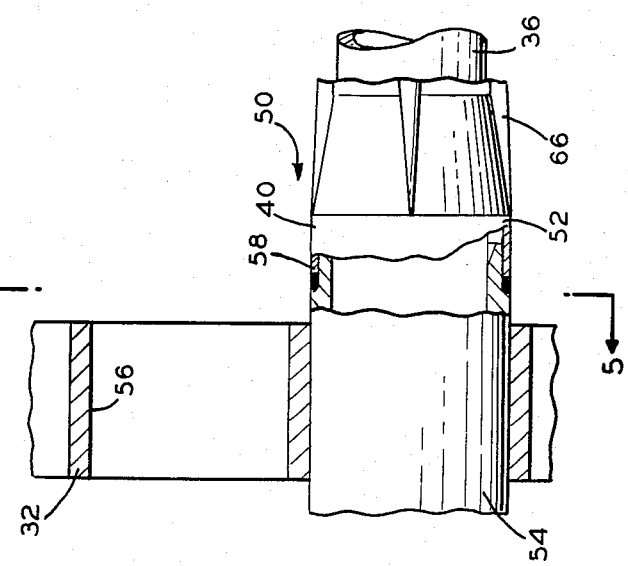

HEAT EXCHANGER HAVING TUBULAR MEMBERS CONCENTRIC WITH FLUID CARRYING TUBES TO PREVENT MIXING OF THE HEAT EXCHANGE FLUIDS AND METHOD OF CONSTRUCTION THEREOF

TECHNICAL FIELD

This invention relates to heat exchangers and methods of construction thereof. More particularly, this invention relates to heat exchangers which have tubular members concentric with fluid carrying tubes for prevention of leakage between fluids involved in the heat exchange.

BACKGROUND ART

Leakage prevention between fluid flowing through the tubes and fluid flowing on the shell-side of an heat exchanger is desired to avoid violent chemical reactions that may occur if certain fluids involved in heat exchange were mixed with each other, and to avoid contamination of one fluid with the other to thereby simplify chemistry control of the fluids involved. For example, it is desirable to prevent contamination of water by either lithium in a fusion reactor steam generator or by seawater in the condenser of a conventional power plant.

In fusion power applications, there is the added requirement of avoiding the diffusion of tritium contained in liquid metal flowing on the shell-side of a steam generator through the tube walls to contaminate steam being generated in the tubes.

Tightly fitting double-walled tubes which are fabricated together for installation in an heat exchanger as a single piece are difficult to install. This is because the weld location for attaching the outer tube wall to its respective tube sheet is virtually inaccessible unless a large tube spacing is utilized along with special welding procedures that tend to be incompatible with reasonable shop costs. As a result, the pitch to diameter ratios of the outer tube sheet apertures of such constructions usually exceed 2.0 as compared to a typical ratio of 1.45 for single-walled tube heat exchangers. However, this higher ratio requires larger sized units and greater liquid metal inventory per thermal megawatt of heat exchange capacity, and results in lower shell-side heat transfer co-efficients than would be the case if the ratio could be reduced substantially. In addition to the resulting higher cost per square foot of heating surface, difficulties in locating and repairing leaks are experienced with such constructions.

DISCLOSURE OF INVENTION

It is desirable to provide an heat exchanger with tubes and tubular members concentric therewith which avoids or minimizes the above problems so that practical heat exchangers of this type can be provided to the power and other industries. Accordingly, it is considered desirable and is an object of this invention to provide such an heat exchanger wherein the pitch to diameter ratio of the outer tube sheet apertures is in the neighborhood of 1.45.

In order to provide such an heat exchanger, the present invention provides at least one radially outwardly projecting portion of a tubular member which is concentric with at least a portion of the length of a tube to define a space between the tube and the tubular member which is closed to the entrance of a fluid from either the tube flow or from shell-side flow. The projecting portion extends longitudinally of the tubular member to provide a means for flexing the tubular member for expanding thereof radially outwardly. By the term "radially" is meant a direction generally perpendicular to the axis of a tube or tubular member. In accordance with another aspect of this invention, the tubular member is assembled in the heat exchanger after which the respective tube is assembled by inserting it through the tubular member while flexing the tubular member so that it expands radially outwardly for such insertion.

The above and other objects and advantages of the present invention will be readily apparent from the following detailed description and drawings which illustrate the preferred embodiments of this invention.

BRIEF DESCRIPTION OF THE DRAWINGS

FIG. 2 is a detail view illustrating attachment of a tubular member to an inner tube sheet in accordance with this invention;

FIG. 3 is a view taken along lines 3—3 of FIG. 2;

FIG. 4 is a detail view illustrating support of a tube in accordance with this invention;

FIG. 5 is a view taken along lines 5—5 of FIG. 4; and

BEST MODE FOR CARRYING OUT THE INVENTION

Figure 1:
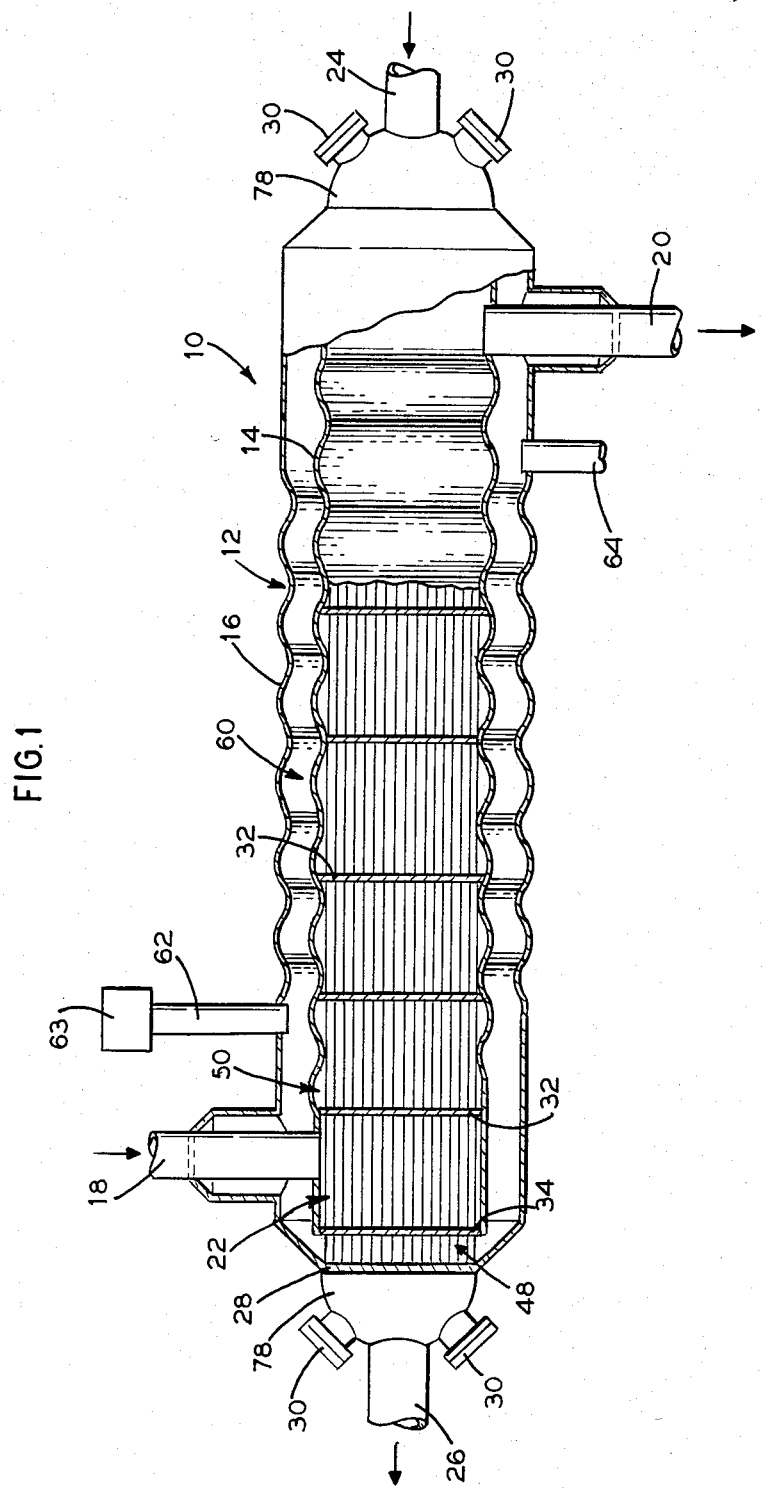
FIG. 1 is a schematic illustrating the general arrangement of an heat exchanger embodying this invention.

Referring to FIG. 1, there is illustrated an heat exchanger 10 which is provided with an elongate shell 12 which has an inner wall 14 and an outer wall 16. An inlet 18 and an outlet 20 are provided for the flow of a first fluid through the shell. A tube bundle illustrated schematically at 22 provides a plurality of tubes which extend longitudinally of the shell 12 from one end thereof to the other in order to provide a path for the flow of a second fluid in heat exchange relation to the first fluid. In order to prevent any cracks in the tubes from propagating all the way through the tubes to result in leaks to or from the tubes, these tubes may be of the duplex type wherein one tube is drawn down tightly on another. However, this invention is not limited to such tubes for the tube bundle, and any other suitable type of tube may be used. An inlet 24 to the tubes of the tube bundle 22 is provided at one end of the shell 12, and an outlet 26 is provided at the other end. An outer tube sheet 28 is provided at each end of the shell 12 into which the tubes of the tube bundle 22 are expanded and welded or otherwise sealingly attached in accordance with engineering principles of common knowledge to those of ordinary skill in the art to which this invention pertains in order to prevent entrance of the first fluid into the tube-side of the heat exchanger 10 or entrance of the second fluid into the shell-side thereof. Manways 30 are provided to the inlet 24 and outlet 26 for repairs and inspection.

Tube support means such as lattices 32 are provided at spaced intervals such as, for example, every 50 to 100 cm. along the length of the shell 12. The outer tube sheets 28 as well as the inner tube sheets 34, which will be described hereinafter, also act as tube support means. These tube support means are disposed generally perpendicular to the tube axes and are rigidly attached to the inner wall 14, except the outer tube sheets 28 are rigidly attached to the outer wall 16. The shell-side inlet and outlet 18 and 20 respectively are constructed, as illustrated in FIG. 1, to provide a fluid flow to the space illustrated at 50 within the inner wall 14 of the shell 12 (shell-side space) and to not provide any flow to the space illustrated at 60 between the inner and outer walls 14 and 16 respectively.

FIGS. 2 and 3 illustrate a portion of an inner tube sheet 34 and a portion of a tube 36 extending through one of the apertures 38 thereof. Also illustrated in FIGS. 2 and 3 is a portion of a tubular member 40 which surrounds at least a portion of the length of the tube 36 to define a space illustrated at 44 between the tube and the tubular member. Since heat transfer is improved as the clearance between a tube and a tubular member concentric therewith is decreased, the clearance of this space 44 between the tubular member and the tube is preferably about 0.0007 in. (0.02 mm.) or less for improved heat transfer. The tube bundle 22 schematically illustrated in FIG. 1 includes a plurality of the tubes 36 and their associated concentric tubular members 40.

An end-fitting 46 is fixedly attached within each aperture 38 of the inner tube sheet 34 to support the respective tube 36. This end-fitting 46 is sized to preferably provide a clearance between the end-fitting 46 and the respective tube 36 of about 0.005 to 0.010 in. (0.1 to 0.2 mm.) in order to allow fluid flow between the space 44 and the space illustrated at 48 which is between the inner and outer tube sheets 34 and 28 respectively. The outer tube sheets 28 act as partitions against fluid flow from the tube-side flow of a second fluid into either the space 48 or the shell-side space illustrated at 50 which is provided for flow of a first fluid between the inlet and outlet 18 and 20 respectively. The tubular member 40 is flared outwardly at one end 52 so that it has a diameter at end 52 equal approximately to the diameter of the respective aperture 38 of the inner tube sheet and is welded or otherwise fixedly attached to the end-fitting 46 which is in turn welded or otherwise fixedly attached to the respective inner tube sheet 34. The inner tube sheets 34 are in turn fixedly attached to the inner wall 14 of the shell and sealingly attached thereto to act as partitions against fluid flow between the spaces 44 and 48 and the shell-side space 50. Although clearance between the end-fitting 46 and tube 36 is large enough to allow fluid flow as previously stated, it is also small enough to allow sealing of the space 44 between a particular tube 36 and tubular member 40 from the space 48 between the inner and outer tube sheets by expanding the respective tube 36 radially outwardly and against the respective end-fitting 46 for sealing engagement therewith if such were to become necessary due to a tube or tubular member leak.

In accordance with this invention, a tubular member 40 may extend the entire distance between the inner tube sheets 34. However, this may result in the tubular members 40 having to bear the loads of the respective tubes 36 at the lattices. Whereas each of the tubes 36 is normally expected to carry a flow of water and steam under high pressure and therefore typically requires a wall thickness of perhaps 0.050 to 0.200 in. (1.3 to 5.1 mm.), the thickness of each outer tubular member 40 is preferably not more than about 0.0015 to 0.0030 in. (0.038 to 0.076 mm.) to provide flexibility to the outer tubular member 40 for reasons which will be hereinafter described. Such a thickness is believed to be sufficient since the tubular member 40 is normally expected to be subjected to lower pressures. However, such a tubular member thickness is not considered to be sufficient for the tubular members 40 to bear the loads of the respective tubes 36 at the tube support lattices 32. In addition, if the tubular members 40 are only long enough to extend between two adjacent tube support means, their lengths will be such as to advantageously allow easier manufacture thereof as will be described hereinafter. Therefore, referring to FIGS. 4 and 5, in accordance with a preferred embodiment of this invention, a ferrule or coupling 54 is provided within each aperture 56 of a tube support lattice 32 in order to support each respective tube 36 therein. A clearance of perhaps 0.010 in. (0.25 mm.), sufficient for pushing the tube through the ferrule without difficulty, is provided between a ferrule 54 and the respective tube 36. As illustrated in FIGS. 4 and 5, an end 58 of a tubular member 40 is flared outwardly to a diameter equal approximately to the outer diameter of the ferrule 54 and is welded or otherwise fixedly attached to the ferrule which may in turn be welded or otherwise fixedly attached to the inner tube sheet, and the tubular member may be welded or otherwise fixedly attached at its other end to a ferrule of an adjacent lattice, or it may be attached to an inner tube sheet 34 as previously described and as shown for end 52 in FIGS. 2 and 3. Thus, the ferrules 54 act to couple the tubular members 40 to provide the equivalent of a single tubular member extending between the inner tube sheets 34 to provide spaces 44 along the entire lengths of the tubes extending between the inner tube sheets to receive leaking fluid from the tubes 36 so that it doesn't leak into the shell-side spaces 50 and to prevent leakage from the shell-side spaces 50 into tubes 36 in applications where the shell-side flow may be at higher pressures than the tube-side flow. In order to provide a fluid flow between adjacent spaces 44, longitudinally extending apertures 61 are provided in the ferrules to interconnect adjacent spaces 44.

Fusion power applications are being considered wherein it is considered desirable to transfer heat from a liquid metal alloy containing dissolved tritium to water for generation of steam. This liquid metal would be provided for shell-side flow from the inlet 18 to outlet 20, and water from which steam would be generated would flow through the tubes from the inlet 24 to outlet 26. In such an application, it is considered desirable to avoid diffusion of tritium through tube walls and its resulting contamination of the steam. Such diffusion through a tube wall may be prevented by chemically combining the tritium with oxygen to produce tritium dioxide, commonly known as heavy water, which does not diffuse through tube walls. Therefore, in accordance with a preferred embodiment of this invention, a means is provided for supplying molecules of oxygen to the spaces 44 between the tubular members and respective tubes in order to effect combination of the oxygen chemically with any tritium which diffuses through the wall of a tubular member 40 to form heavy water so that the tritium will not then diffuse through the wall of the respective tube 36. This oxygen is preferably provided in a ratio of just a few parts per million in a carrier fluid. Preferably, the carrier fluid is a gas such as helium or a liquid which has high thermal conductivity in order to provide good heat transfer across the spaces 44. In order to provide such a gas to all of the spaces 44 between the tubular members and their respective tubes, the shell 12, as shown in FIG. 1, is preferably provided with the inner wall 14 and the outer wall 16 as previously described, and the space illustrated at 60 between the inner and outer walls 14 and 16 respectively is in fluid communication with the spaces 48 between the respective inner and outer tube sheets which spaces 48 are in turn in fluid communication with the spaces 44 between the tubular members and their respective tubes as previously described. Means such as an inlet 62 and an outlet 64 to this space 60 are preferably provided to supply and circulate this carrier gas by means of a pump 63 or other suitable means through the carrier gas spaces which of course comprise spaces 44, 48, and 60. Suitable baffles (not shown) may be positioned in the space 60 to direct the carrier gas through the tube bundle effectively in accordance with engineering principles of common knowledge to those of ordinary skill in the art to which this invention pertains. Although a clearance of about 0.0007 in. (0.02 mm.) is preferred between a tube 36 and respective tubular member 40, this is believed to be sufficient to provide sufficient oxygen in spaces 44 especially since the projecting portions 66, which will be described hereinafter, will provide more than adequate movement of the carrier gas and oxygen molecules in a direction longitudinally along the tubular members 40.

The outer tube sheets 28 are sealingly attached to the outer wall 16 and the tubes 36 are sealingly attached to the outer tube sheets 28 to prevent leakage from the tubes 36 and the other second fluid spaces into the carrier gas spaces. Likewise, the inner tube sheets 34 are sealingly attached to the inner wall 14 and tubular members 40, in addition to being sealingly attached to respective couplings 54, are also sealingly attached to end fittings 46 which are in turn sealingly attached to the inner tube sheets 34 to prevent leakage between the shell-side spaces 50 and the carrier gas spaces. The inner and outer walls 14 and 16 respectively of the shell are preferably corrugated over at least a portion of their length in order to permit expansion and contraction thereof to compensate for differentials in temperature between the tubes 36, tubular members 40, and the walls of the shell 12 so that the tubes 36 may be protected from undue stresses caused by such temperature differentials.

As best shown in FIG. 3, in accordance with the present invention, a tubular member 40 is provided with at least one but preferably a plurality such as four radially outwardly projecting portions 66. These projecting portions 66 extend in a longitudinal direction of the tubular member 40 (that is, in a direction parallel to the axis thereof) to provide means for flexing the tubular member 40 for expanding thereof radially outwardly by bending of the material thereof at the projection portions rather than by stretching of the material thereof. Each projecting portion 66 is formed by the wall of the tubular member 40, as viewed in a cross-section taken in a plane perpendicular to the longitudinal axis, extending in a circumferential direction to a first point illustrated at 68 from which first point the course of the tubular member wall 40 changes so that it extends radially outwardly to a second point illustrated at 70 from which second point the course of the tubular member wall 40 again changes so that it extends radially inwardly to a third point illustrated at 72 from which third point the course of the tubular member wall 40 again changes so that it extends again in the circumferential direction. Thus, a small gap illustrated at 74 is provided between the first and third points 68 and 72 respectively. The resulting flexibility is provided in order to reduce the amount of clearance required in the radial direction between the tubular member 40 and the respective tube 36 for improved heat transfer while allowing the insertion of a tube 36 by temporarily increasing the amount of clearance by the use of hydraulic pressure or other suitable means. The projecting portions 66 also permit the tubular members 40 to more easily conform to small bows and ovalities which may be present in the tubes 36.

Since, in accordance with the present invention, it is not required that a tube 36 and its respective tubular members 40 be installed or assembled as a unit in constructing an heat exchanger, the tubular members 40 may be assembled first and the tubes 36 thereafter inserted in the tubular members.

In order to construct an heat exchanger in accordance with this invention, tubular members 40 as described above and as illustrated are fabricated. A tubular member may be fabricated by collapse of a thin walled tube over a removable mandrel through the application of external hydraulic pressure. Alternatively, a tubular member may be fabricated from flat sheet pre-formed to contain the projecting portions and then welded to provide a longitudinal seam. The ends of the tubular members 40 may be mechanically expanded to achieve the larger diameter cylindrical ends which are preferred. Other suitable means may also be used to fabricate a tubular member.

In accordance with one method of assembly, the tubular members 40 are attached to the couplings 54 and end fittings 46 and the resulting assemblies inserted into the apertures 56 of the lattices 32 and welded at each end to the inner tube sheets 34 without the tubes 36 inserted therein, thus allowing greater access for welding of the tubular members 40 to the inner tube sheets 34 so that an uneconomically large outer tube sheet aperture pitch to diameter ratio is not required and one of perhaps 1.45, which is typical of single tube designs, may be achieved. The resulting assembly is then installed in the shell 12 and the inner tube sheets 34 attached to the inner wall 14. Alternatively, inner wall 14 may be assembled with the tube sheets 34 and lattices 32 afterwhich assemblies of tubular members 40, couplings 54, and end fittings 46 may be inserted and attached at each end to the inner tube sheets 34.

After the lattices 32, inner tube sheets 34, and tubular members 40 are assembled to the inner shell wall 14, the outer tube sheets 28 are positioned in their proper relation to the assembly and the tubes 36 are inserted into the tube sheets, tubular members, and couplings as previously described. The tubes 36 may then be rolled and welded to the outer tube sheets 28 and the outer tube sheets welded to the shell outer wall 16 in accordance with engineering principles of common knowledge to those of ordinary skill in the art to which this invention pertains. Finally, the shell-side inlet and outlet pipes, tube bundle inlet and outlet, heat exchanger foundations (not shown), hemispherical heads 78, and any other suitable components are assembled to complete the unit.

A fluid leaking into the space 44 between a tubular member and its respective tube will normally be expected to be carried by the flow of the carrier gas toward and to partially fill the annulus illustrated at 76 which adjoins the end-fitting. This should be detectable during inspection by use of a conventional eddy current probe inserted into the tube. Repair may be effected by expanding the tube 36 against the respective end-fitting 46 at each end to eliminate fluid flow through the space between the tube 36 and end-fitting 46, and then if it is the tube that is leaking, by plugging the tube 36 at each end.

Since a tube 36 is easily removable from its respective tubular members 40, if a sufficiently large manway is provided in one of the hemispherical heads 78, an individual tube may then easily be replaced or removed to inspect and repair its corresponding assembly of tubular members. Thus, the ability to remove a tube from the tubular members 40 provides additional repair and inspection advantages.

Figure 6:
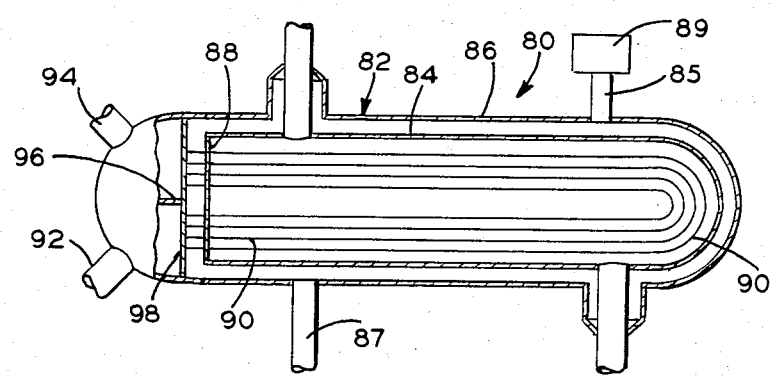
FIG. 6 is a schematic of a general arrangement of an alternative embodiment of an heat exchanger embodying this invention.

An alternative embodiment of this invention is shown in FIG. 6. As shown there, an heat exchanger 80 is provided with an elongate shell 82 having an inner wall 84 and an outer wall 86, an inlet 85 and an outlet 87 for carrier gas, a carrier gas pump 89, and a inner tube sheet 88 attached to the inner wall 84 for sealingly attaching tubular members as similarly described for similar components in the embodiment shown in FIG. 1. However, in this embodiment, the heat exchanger 80 is provided with a plurality of U-bend tubes 90 wherein both inlet and outlet means 92 and 94 respectively of the tubes are provided at the same end of the shell 82 with a partition wall 96 therebetween. A single outer tube sheet 98 is provided for sealingly attaching the tubes 90 at the inlet and outlet ends and the outer tube sheet 98 is sealingly attached to the outer wall 86 of the shell in a similar manner as described for the embodiment of FIG. 1. An outer tube sheet at the other end of the shell 82 is, of course, not required for this embodiment. In this embodiment of the invention, the U-bend tubes 90 are inserted into the tube sheets 88 and 98 and the corresponding tubular members from the end of the shell 82 which is opposite to the end which contains the outer tube sheet 98. After insertion, the tubes are then rolled and expanded into the apertures of the outer tube sheet 98 and welded thereto using engineering principles of common knowledge to those of ordinary skill in the art to which this invention pertains. In accordance with this construction, it is believed that a tube leak in the area of a U-bend may be repaired by the use of an explosive tube expanding method.

The heat exchangers 10 and 80 shown in the drawings may be mounted either horizontally or vertically. Among the uses of such an heat exchanger are as an economizer, evaporator, superheater, and reheater for liquid metal fast breeder reactor systems, and for fusion reactors utilizing sodium or lithium/lead alloy for thermal transport of heat from the reactor to the steam cycle. Other uses include surface condensers and special applications involving organic fluids or molten salts. For example, such an heat exchanger is useful as a condenser wherein seawater is used as the condensing medium, in which case it is desirable that the condensed water not be contaminated by salt from the seawater. In such a case as well as in other applications wherein it is not necessary to prevent tritium or similar substances from diffusing through tube walls, it would not normally be necessary that the shell have an inner and outer wall or that means be supplied for providing oxygen to the spaces 44 between the tubes and their respective tubular members.

Certain features of this invention may sometimes be used to advantage without a corresponding use of the other features. It is also to be understood that the invention is by no means limited to the specific embodiments which have been illustrated and described herein, and that various modifications may indeed be made within the scope of the present invention as defined by the claims which are appended hereto.

I claim:

1. A method for constructing an heat exchanger comprising:
    a. fabricating a tubular member which has at least one radially outwardly projecting portion which extends longitudinally of the tubular member to provide flexibility to the tubular member for expanding thereof radially outwardly to insert a tube therethrough;
    b. sealingly attaching the tubular member within a shell to prevent entry of a first fluid flowing between an inlet and outlet of the shell to the space bounded by the tubular member;
    c. flexing the tubular member while inserting a tube through the tubular member;
    d. sealingly attaching the tube within the shell to prevent entry of a fluid flowing through the tube to the resulting space between the tube and the tubular member; and
    e. assembling an inlet and an outlet for flow of a second fluid through the tube in heat exchange relation with the first fluid.

2. A heat exchanger comprising
    a shell having an inlet means and an outlet means for the flow of a first fluid therethrough,
    a plurality of tubes within the shell to provide a path for flow of a second fluid in heat exchange relation to the first fluid, and inlet means and outlet means disposed on respectively opposite ends of the heat exchanger for flow of the second fluid to and from said tubes respectively,
    a tubular member concentric with at least a portion of the length of at least one of said tubes, defining a space between said tube and said tubular member which is closed to flow of both the first fluid and the second fluid,
    a plurality of tube support means spaced apart and disposed generally perpendicular to the tube axes, having said tubular member fixedly attached at one end to one of said tube support means and at the other end to an adjacent one of said tube support means, wherein two of said tube support means comprise a pair of outer tube sheets for sealing attachment of said tubes at each of the ends respectively thereof to provide partitions against fluid flow between said space and the spaces for second fluid flow,
    said shell comprising an inner wall and an outer wall defining a space between said inner and outer walls which is closed to both the first and second fluid and in fluid flow communication with said space between said tube and said tubular member for flow of a third fluid therebetween,
    partitions between said third fluid flow spaces and the spaces for first fluid flow comprising two of said tube support means formed as tube sheets which are disposed inwardly of said outer tube sheets and sealingly attached to said tubular members and said outer shell wall, and
    means including at least one radially outwardly projecting longitudinally extending portion on said tubular member for flexing said tubular member for expanding thereof radially outwardly.

3. An heat exchanger according to claim 2 wherein said projecting portion is formed by the wall of said tubular member extending, as viewed in a cross-section taken in a plane perpendicular to the longitudinal axis of said tubular member, in a circumferential direction to a first point from which first point the course of said tubular member wall changes direction so that it extends radially outwardly to a second point from which second point the course of said tubular member wall changes direction so that it extends radially inwardly to a third point from which third point the course of said tubular member wall changes direction so that it extends in said circumferential direction whereby a gap is provided between said first and third points.

4. An heat exchanger according to claim 2 further comprising means for introducing oxygen to said third fluid flow spaces to combine with tritium diffusing through a wall of said tubular member from a first fluid to prevent diffusion of the tritium through a wall of said tube.

* * * * *